United States Patent [19]

Roberts, III

[11] 3,965,429

[45] June 22, 1976

[54] CIRCUITRY FOR USE WITH A TRANSDUCER WHICH GENERATES A SIGNAL CORRESPONDING TO A PHYSICAL PHENOMENON

[75] Inventor: Harry E. Roberts, III, Wilmington, Del.

[73] Assignee: Columbia Research Laboratories, Inc., Woodlyn, Pa.

[22] Filed: May 17, 1974

[21] Appl. No.: 471,009

Related U.S. Application Data

[63] Continuation-in-part of Ser. No. 264,781, June 21, 1972, Pat. No. 3,858,443.

[52] U.S. Cl. .................................. 328/1; 73/88.5 R
[51] Int. Cl.² .................. G01N 27/00; G08B 19/00
[58] Field of Search ......................... 328/1; 307/308; 73/88.5 R; 340/261; 333/75

[56] References Cited
UNITED STATES PATENTS

| | | | |
|---|---|---|---|
| 2,495,511 | 1/1950 | Dolberg | 333/75 |
| 2,968,031 | 1/1961 | Higa | 328/1 |
| 3,229,210 | 1/1966 | Frank et al. | 328/1 |
| 3,344,283 | 9/1967 | Stubbs | 340/261 |
| 3,852,672 | 12/1974 | Nelson | 328/1 |

Primary Examiner—Stanley D. Miller, Jr.
Assistant Examiner—B. P. Davis
Attorney, Agent, or Firm—William E. Cleaver

[57] ABSTRACT

The present circuit is primarily designed to be employed with a transducer which generates a signal in response to some physical phenomenon and said present circuit provides a direct current signal which is an excellent representation of the intensity of said physical phenomenon. In addition said circuit has excellent response over a broad frequency range as related to said physical phenomenon and has high signal to noise ratio. The present circuit principally utilizes a low pass filter which provides a relatively flat response at all frequencies below one-half of the carrier frequency as well as employing a notch filter designed to filter signals at twice the carrier frequency. The twice filtered signal is a low ripple direct current signal having the earlier described characteristics.

5 Claims, 12 Drawing Figures

CIRCUITRY FOR USE WITH A TRANSDUCER WHICH GENERATES A SIGNAL CORRESPONDING TO A PHYSICAL PHENOMENON

CROSS REFERENCE

The present application is a continuation-in-part of U.S. patent application Ser. No. 264,781 entitled "Torque Measuring and Control System" filed June 21, 1972 which has now issued as U.S. Pat. No. 3,858,443 on Jan. 7, 1975.

BACKGROUND

The present invention relates to a circuit to be used with a transducer to generate a well defined direct current signal in response to the transducer output and said circuit as described in particular as it is used with a device to measure extraordinary torque and which generates signals to control and/or monitor the torque generating means in response thereto.

In many technical applications shafts are employed to rotate and transmit power from one place to another. For instance, in bolting parts of an automobile together, the bolts must be sufficiently "tight" so that they will not vibrate loose when the automobile is in operation on the road. This requirement means that a sufficient amount of torque must be applied to a bolt to turn it beyond a simple bottoming out point to become a "tight" bolt. On the other hand the driving must not apply so much torque beyond the bottoming out position that the bolt head gets sheared or the bolt threads get stripped. While it has very often been the practice to provide a clutch on the shaft or to use a soft pin through the shaft being rotated, such arrangements require severe limitations of the applied power. The clutch must be spring-loaded in some fashion; and when the torque exceeds the permissible value, the clutch disengages. Such arrangements are not very exacting nor are they quickly responsive. The soft pin technique of course requires that the sheared off pin be driven from the shaft and replaced upon the occasion that the shaft has experienced an excessive amount of torque and the pin has sheared.

SUMMARY

In the preferred embodiment the present system employs a torque transducer which has a pair of flanges each of which has an aperture therein. The transducer has a first flange which may be considered the fixed flange and has a second flange which may be considered the force flange. In between the fixed flange and the force flange is a tube or hollow shaft which enables the shaft transmitting the power to pass therethrough. The force flange has means which enable it to be secured to the housing of the source of power, for instance a motor, which is driving the shaft providing the torque. The fixed flange has means to enable it to be secured to a relatively stable means, such as a heavy frame holding the entire structure or a wall. The stable means need only be a means which will not respond to any reaction of the power source. Mounted on the fixed flange is a pair of sensor supports each of which holds a pair of E-coils. The force flange supports a pair of vane holders upon each of which there is mounted a piece of metal having high permeability to magnetic flux and called a vane. Each of the vanes is disposed between an associated pair of E-coils. When the force flange experiences a twist or torque with respect to the fixed flange the vane supports move and the associated vanes are displaced to be in closer proximity to one or the other of said E-coils. The uneven displacement provides the basis for a dissimilarity and an electrical signal.

Heretofore strain gages have been employed to provide an output signal which is representative of such a torque, but strain gages are limited by low amplitude output signals. In contrast an E-coil with a vane arrangement as just described provides a high amplitude output signal but that advantage is often lost with the generation of an equivalently high noise. To overcome the conflicting characteristics of high amplitude output accompanied by high noise, special circuitry is employed which is the subject of this continuation in part.

The E-coils are electrically connected in a bridge circuit and the output of the bridge circuit is subject to a full wave demodulation to produce a pulsating D.C. voltage with a fundamental ripple frequency of two times the carrier frequency. The pulsating D.C. signal is passed through a notch filter which is designed to filter a signal having a frequency of twice the carrier signal which in turn provides a low ripple D.C. signal whose voltage level is an excellent representation of the difference in the torque between the force flange and the fixed flange.

The objects and features of the present invention will be better understood in accordance with the description below taken in conjunction with the drawings wherein.

Figure 1:
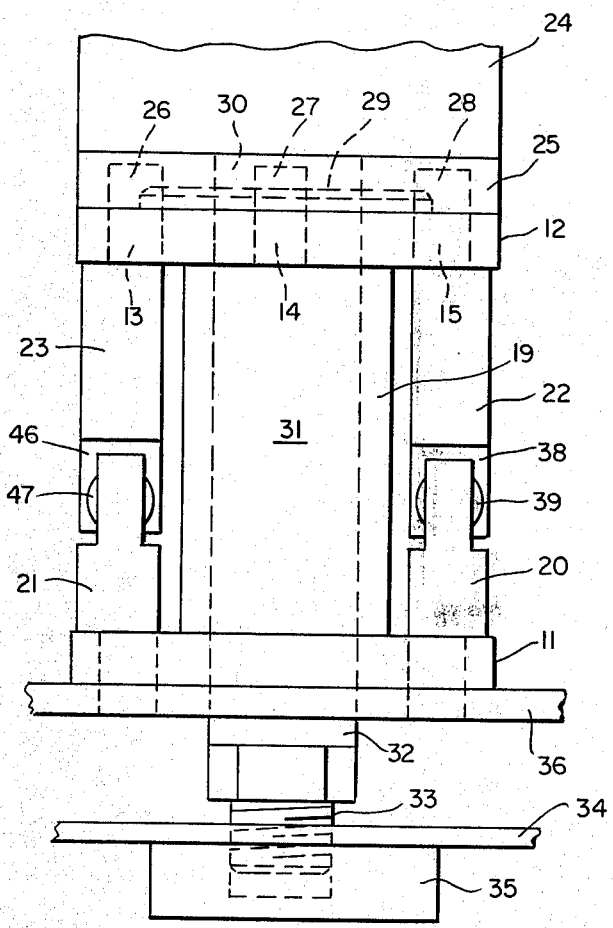
FIG. 1 is a pictorial schematic of a front view of the transducer coupled to a motor driven bolting device.

Consider FIG. 1 which shows a front view of the transducer of the present invention coupled to a motor driven bolting device. In FIG. 1 there are shown flanges 11 and 12, each of which has six bolt holes therein, three of said bolt holes are depicted in phantom, the other three holes in each flange are not shown in FIG. 1. The holes 13 through 18 are better seen in FIG. 3 which is a top view of the force flange 12. It should be understood that bolt holes 13, 14 and 15 can be either threaded or not threaded. As can be seen in FIG. 1 there is a center tube or hollow shaft 19 which is rigidly secured between the flanges 11 and 12. Also as can be seen in FIG. 1 there is a pair of sensor supports 20 and 21 which are mounted on the fixed flange 11. In addition as can be seen in FIG. 1 there is a pair of vane supports 22 and 23 which are shown mounted on the flange 12. The same identification numerals are used in FIGS. 2 and 3. In the Figures the vanes and sensors are shown external to the center tube 19; however, the ID of the hollow shaft 19 could be large enough to house the vanes and sensor supports.

In FIG. 1, there is also depicted a motor 24 which has a coupling plate 25 secured thereto. The coupling plate 25 has three threaded bolt holes 26, 27 and 28 (shown in phantom) therein. The threaded bolt holes 26, 27 and 28 match the bolt holes 13, 14 and 15, and while it is not shown as such (in order to keep the drawings simplified), it should be understood that the force flange 12 is bolted to the plate 25. It can also be seen in FIG. 1 that the force flange 12 has a guide plug 29 (shown in phantom in FIG. 1, but which can be seen in FIG. 3). The guide plug 29 fits into the plate 25 and aligns the bolt holes as well as the center apertures 30 and 31. The center aperture 30, (in the plate 25) and center aperture 31 (the hollowed out portion of center tube 19) when aligned permit the drive shaft 32 to pass therethrough. The drive shaft 32 is part of the motor 24 and is the means by which torque is delivered to the bolt 33. The drive shaft 32 is equipped with an hexagonal cup into which the hexagonal head of the bolt 33 is inserted.

In FIG. 1 the bolt 33 is depicted as being threaded or screwed downward in order to bolt the plate 34 to the support 35. Plate 34 and support 35 could be sections of an automobile, airplane, boat or the like. It should be borne in mind that the motor 24, shaft 32, bolt 33, plate 34 and support 35 are not part of the present invention but are merely offered to help teach the invention.

One other item should be noted in FIG. 1; i.e., that the fixed flange 11 is secured to a reference means 36. The reference means 36 can be a portion of a heavy frame, a motor housing, a wall or some means upon which there is very little or no effect in response to the reaction of the motor 24 when the bolt 33 bottoms out.

Figure 3:
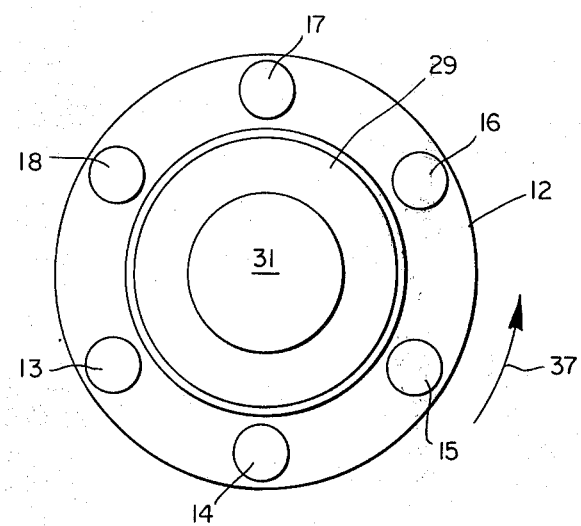
FIG. 3 is a top view of the transducer shown in FIG. 1.
Figure 2:
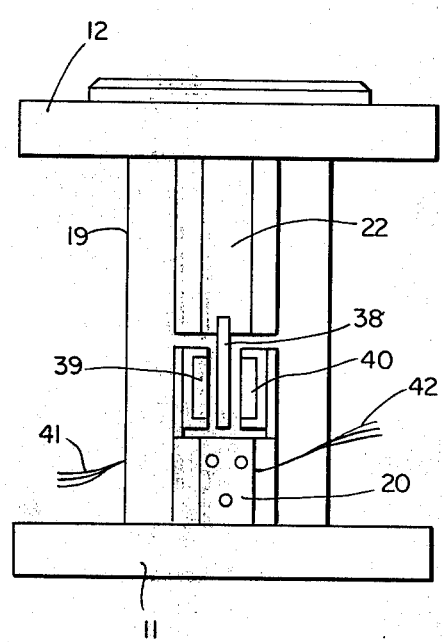
FIG. 2 is a pictorial schematic of a side view of the transducer per se.

Consider FIGS. 1, 2, and 3 together and consider that the motor 24 is driving the shaft 32 which in turn is tightening the bolt 33. When the head of the bolt 33 abuts the plate 34, the bolt will resist any further clockwise rotation and the motor will react by attempting to rotate counterclockwise (obviously if the bolt 33 is threaded with a left-hand thread the directions are opposite from those just described) as shown in FIG. 3 by vector 37. The motor is secured, through plate 25 to force flange 12. Therefore as the motor attempts to twist the bolt 33 clockwise, it moves around counterclockwise on shaft 32 and hence twists the force flange 12 in a counterclockwise direction. Even though the force flange 12 is coupled to the fixed flange 11 by virtue of the center tube 19, the fixed flange 11 will not move since it is secured to the reference means 36.

Accordingly, if we consider FIG. 1, the vane support 22 would be moving into the drawing while the vane support 23 would be moving out of the drawing. When the vane 22 moves, as though it were into the drawing, the vane 38 moves away from the E-coil 39 toward the E-coil 40; thereby increasing the reluctance for magnetic flux being developed in the E-coil 39. Therefore, a difference of electrical impedance between the E-coils 39 and 40 is developed. While E-coils are discussed herein, it should be understood that many electromagnetic devices such as U-coils, etc. could be used.

The flanges 11 and 12 are made of 410 stainless steel, which has been suitably heat treated, while the center tube 19 can also be made of stainless steel. The vane supports 22 and 23 are fabricated from non-permeable material, such as 303 stainless steel, while the sensor supports 20 and 21 are fabricated from the same non-permeable material.

It should be noted in FIG. 2 that there are shown lead-in wires 41 and 42 which enable the signals to be applied to the E-coils and which enable signals developed by the E-coils to be transmitted to some other location. It should be understood that there are a pair of E-coils lying opposite the E-coils 39 and 40 which are mounted on the support sensor 21 and which cannot be shown or seen in FIG. 2.

Figure 4:
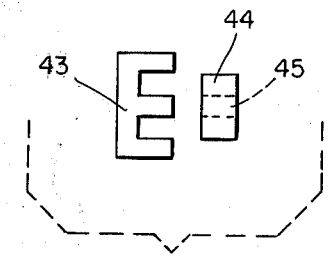
FIG. 4 is an exploded view of E-coil.

In FIG. 4 there is shown an E-shaped yoke 43 which is representative of the E-shaped yokes which make up part of the assembly referred to as E-coils, such as E-coils 39 and 40. Also in FIG. 4 there is shown a coil 44 which has an aperture 45 therein which fits over the E-shaped yoke 43 to form an E-coil of the type referred to as E-coils 39 and 40. When a signal is applied to the E-coil 44 assuming that the coil 44 is mounted on the E-shaped yoke 43, magnetic flux will pass through the center stem of the E-shaped yoke and out through the upper and lower ends and back into the center stem. The magnetic flux passing out the ends of the E-shaped yoke and returning to the center piece will have to pass through air which has a relatively high impedance to magnetic flux. If there is a vane, or a metal piece, which is fitted over the end pieces as well as the center piece then the magnetic path or flux path experiences a low impedance. Hence, when an electrical signal is applied there is more back EMF generated and the electrical signal experiences a higher electrical impedance. This is the principle with which the transducer is employed.

Accordingly in our example, shown in FIG. 1, as the force flange 12 moves counterclockwise the vane 38 moves closer to E-coil 40 providing a higher electrical impedance thereat than an electrical signal is experiencing at E-coil 39. On the other hand the vane 46 moves close to E-coil 47 to provide a high electrical impedance thereat as compared with the other coil 49 (not shown) on the left-hand side of FIG. 1. This imbalance of electrical signal is transmitted on lines 41 and 42 and is proportional to the amount of torque experinced by flange 12 with respect to flange 11.

Figure 5:
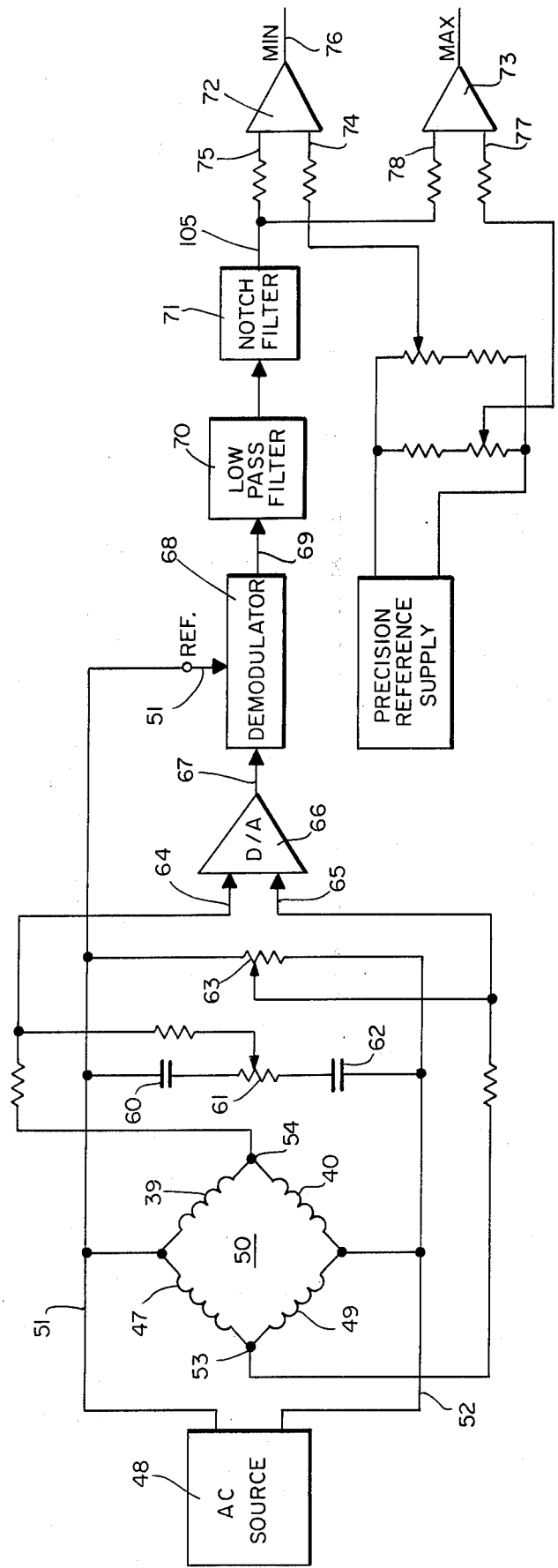
FIG. 5 is a partially schematic and block diagram of an electrical system which can be used with the present transducer.

Consider FIG. 5 which is a partial schematic block diagram of one embodiment of circuitry which in fact makes the transducer of the type above, or other transducers such as strain gages, that may utilize a carrier frequency for operation, into a superior device for the measurement of torque. In FIG. 5 there is depicted an a.c. source 48 which provides an a.c. signal to the coils 39, 40, 47 and 49 of bridge 50. The coils 39 and 40 in FIG. 5 are representative of the E-coils shown in FIGS. 1 and 2. Although there are no keepers or vanes shown in FIG. 5 it is to be understood that the coils 39, 40, 47 and 49 are E-coils mounted on a transducer similar to the transducer shown in FIGS. 1, 2 and 3. It should also be understood that the coils 39, 40, 47 and 49 have associated vanes that are moved as described earlier to influence the flux path of the flux generated by these last-mentioned coils.

An a.c. signal is supplied from the a.c. signal source to the lines 51 and 52. Across the lines 51 and 52 there is connected a bridge circuit 50 comprising the four coils 39, 40, 47 and 49. The four coils 39, 40, 47 and 49 are connected in the classical bridge configuration. When the vanes are moved the coils which lie opposite to one another are affected simultaneously. By way of example, when the vanes are moved as described earlier the electrical impedance of the coil 40 is increased and simultaneously the electrical impedance of the coil 47 is increased. In a like fashion, when the vanes are moved in the opposite direction, the electrical impedance of the coil 39 is increased and simultaneously the electrical impedance of the coil 49 is increased.

When the bridge is in its neutral position, that is, when the keepers are not moved in any direction, such as under circumstances when there is no torsion being measured, ideally there should be no output signal at the terminals 53 and 54. Unfortunately the coils are never fabricated perfectly; i.e., the impedance of the coils do not match. Hence, an applied signal under no load conditions finds an unbalanced bridge, not only in an impedance sense, but in phase relationship sense and this unbalance results in an error or an output signal at the terminals 53 and 54. In order to correct or effectively remove this no load output signal, two signals are added. A phase correction signal is added to the bridge output signal and in addition there is an amplitude correction signal added. Both of these correction signals are out of phase with the applied signal and as will be apparent hereinafter their summation will nullify or effectively "wipe out" the no-load output signal.

Figure 6:
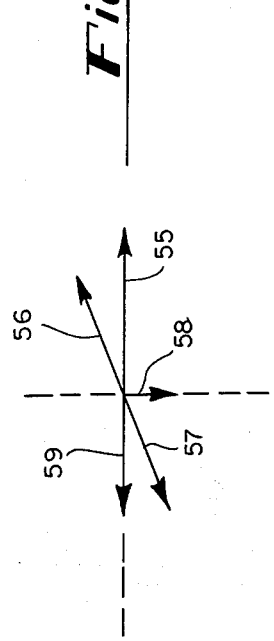
FIG. 6 is a vector diagram showing the signals present in the initial part of the circuitry of FIG. 5.

The nullification of the no-load output signal can be better understood if we consider FIG. 6 wherein we find that the reference signal (that is the signal from the a.c. signal source) is represented by the vector 55. We also find in FIG. 6 that the no-load output signal from the bridge 50 can be represented by the vector 56. Note that the no-load output signal 56 has a phase shift from the applied signal 55. Vector 56 in FIG. 6 is arbitrarily chosen and can vary at an angle and length depending upon what the mismatch is between the impedance and the phase of the E-coils. In order to nullify the signal represented by vector 56 the system must generate a signal whose amplitude is equal to the vector 56 and whose phase is 180° from the vector 56, this signal is represented by the vector 57. The generation of the signal 57 is accomplished by generating one signal represented by the vector 58 and a second signal represented by the vector 59. It will be noted that there is connected across the lines 51 and 52 a capacitor 60, a resistor 61, and a capacitor 62. This arrangement will give a 45° to 90° phase shift to a signal at the tap of the resistor 61, which signal is added to the output signal appearing at the terminals 53 and 54. The signal appearing at the tap of the resistor 61 as shown by the vector 58. Actually the vector 58 need not be a 90° signal and this would depend upon where the tap is located on resistor 61. The signal 58 however would be at some angle very close to 90°. Nonetheless the signal appearing at the tap of the resistor 61 would have a component which would be 90° to the reference signal 55.

Simultaneously with the generation of the 90° signal 58, the adjustable resistor 63 is adjusted until there is no bridge output signal appearing at the lines 64 and 65. This accomplished by the signal 59 which is 180° out of phase with the signal 55 and the vectorial addition of the vectors 58 and 59 provides the signal 57 which nullifies the no-load output signal 56. It should be understood that the generation of signal 59 is accomplished by simply reading an oscilloscope or some other means set up to read the output signal on lines 64 and 65 as the resistor 63 is being adjusted. When there is no output signal for the no-load condition then the variable resistor 63 has been adjusted to the proper location.

Now it should be borne in mind that while there have been out of phase signals added to nullify the no-load output signal this correction does not eliminate the phase shift which takes place between the applied signal on lines 51 and 52 and the output signal appearing at the output terminals 53 and 54 when the system is operating under a load condition. This will become more apparent hereinafter.

As was mentioned earlier when the transducer is experiencing an extraordinary torque condition the vanes will be moved toward one or the other set of coils of the bridge 50, that is toward coils 39 and 49, or toward coils 40 and 47. In this situation, the electrical impedance of the coils toward which the keepers are moved will be increased and hence there will be a potential difference across the output terminals 53 and 54, thus providing an output signal. This output signal is the measure of the torque being experienced by the transducer under load conditions. The output signal will appear at lines 64 and 65 which are input lines to the difference amplifier 66. The output signal from the difference amplifier 66 appearing on line 67 will be a sine wave whose varying amplitude will represent the output signal from the bridge 50 as it appears at the terminals 53 and 54 and which will have a phase shift from the reference signal due to the distributive capacitance of the bridge as well as the inductance present in the E-coils which make up the bridge. As will be explained in more detail hereinafter the demodulator 68 acts to convert its varying signal input into a pulsating d.c. signal. The demodulator 68 is connected to receive the reference signal on line 51 so that there results an output signal on line 69 which is a pulsating d.c. signal whose amplitude represents the difference signal transmitted on line 67 but whose frequency is twice that of the reference signal applied on line 51. This pulsating d.c. signal is transmitted to the low pass filter 70 from whence there is transmitted a resultant output signal which is a d.c. signal having some components at twice the reference signal frequency. In other words, the low pass filter 70 impedes all signals which have a frequency greater than one-half the reference frequency. Thereafter the signal from the low pass filter 70 is passed to a notch filter 71, which is a doublt T network whose parameters are chosen to attenuate a signal whose frequency is twice the reference signal frequency.

The notch filter 71 serves to remove the signal component having a frequency of twice that of the reference signal from the d.c. output and thus to provide d.c. signal whose voltage level represents the difference signal developed at the output terminals 53 and 54 of the bridge 50. The non-pulsating d.c. output signal from the notch filter 71 is transmitted to the difference amplifiers 72 and 73. The amplifier 72 can be considered as a low torque monitor which can cause some logic circuitry to respond when the torque being monitored is below a certain level. On the other hand, amplifier 73 can be considered as a high torque monitor in a comparison circuit which can cause some logic circuit to respond when the torque being monitored is above a certain level. The output signals from the amplifiers 72 and 73 are generated by comparing the non-pulsating d.c. signal from the notch filter 71 with a precision reference supply signal. If, for example, the device is being used to monitor a tool which was securing bolts in an automobile body frame and there is a known value of minimum torque which must be applied to a bolt to keep it from vibrating loose when the automobile is in operation then the representative value of voltage (i.e., a voltage value representing that minimum torque) would be applied on the line 74. Accordingly, if the torque applied, as represented by the output signal from the bridge 50, and as further represented by the output signal at the notch filter 71, falls below the minimum value then the signal on line 75 would be below the value of line 74 and an output signal on line 76 would indicate an insufficient torque for safely bolting to parts of the automobile body.

On the other hand, if too much torque would overstress the bolts beyond safe limits in our automobile example, then a maximum torque is determined and the applied torque must be kept below this maximum value. In order to monitor this upper limit of torque, an appropriate reference signal is applied on line 77. This signal provided on line 77 would represent a torque which is less than the maximum torque but higher than the minimum torque. If the applied torque represented by the difference signal from the bridge and further represented by the output signal of the notch filter, approaches the maximum value, the signal on line 78 would exceed the signal on line 77 and the maximum amplifier 73 would have an output signal. The maximum output signal would cause a logic control circuit to terminate the bolting operation to prevent the bolt from being sheared or simply warn the operator to terminate the bolting operation.

Figure 7:
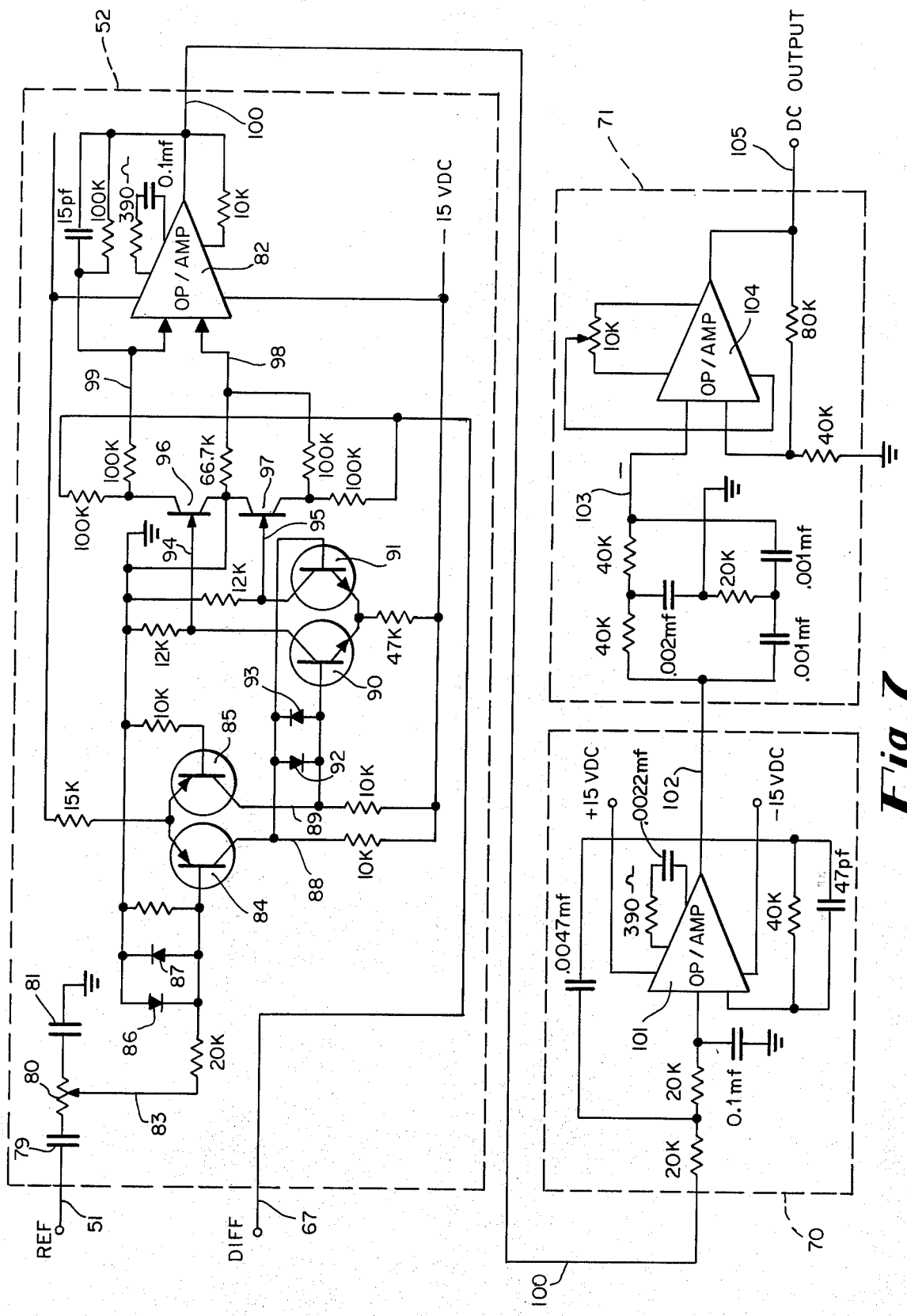
FIG. 7 is an embodiment of the details of the circuit which can be used as the circuitry shown in the block portions of the diagram of FIG. 5.

A more detailed study of the circuits of the preferred embodiment can be seen in FIG. 7. In FIG. 7 the reference signal mentioned in connection with FIG. 5 is found on line 51 while the difference signal is found on line 67. The reference signal found on line 51 is phase shifted by virtue of the serial connection made up of the capacitor 79, the resistor 80, the capacitor 81, and ground. This particular arrangement will phase shift the reference signal by a maximum of 45°. Since it has been determined that the difference signal developed at the output terminals 53 and 54 usually does not phase shift more than 20° from the reference signal, the possible adjustment of the phase shift of the reference signal to a maximum of 45° is sufficient. The tap on the resistor 80 is adjusted so that the reference signal is phase shifted to be in phase with the difference signal on line 67. This is accomplished before the device or circuit is put into use by putting some load on the torque mechanism and reading the output signal from the operational amplifier 82. When the output signal from the operational amplifier 82 is at a maximum value then the position to which the tap of a resistor 80 is set is the correct position.

As can be seen in FIG. 7, the reference signal which has now been phase shifted is transmitted on the line 83 to the base elements of the transistors 84 and 85. In accordance with this transmision, the signal is clipped by the diodes 86 and 87 so that the output signal from each of the transistors 84 and 85 is an amplified output signal, having a rectangular configuration, appearing at the collectors 88 and 89. The transistors 84 and 85 are turned on alternatively. The output signals from the collectors 88 and 89 are further transmitted to the base elements of the tannsistors 90 and 91, and in accordance therewith are clipped by the diodes 92 and 93. The twice amplified signals from the transistors 90 and 91 are transmitted from their respective collectors on the lines 94 and 95 to the respective gate elements of the field effect transistors 96 and 97. The field effect transistors 96 and 97 are cut off with a negative signal and are turned on when the positive going signal reaches "ground" level. Accordingly the field effect transistors 96 and 97 will conduct when their gate elements are subjected to a positive signal (ground signal). Since the rectangular pulses from the transistors 90 and 91 are generated alternately, i.e., 180° out of phase it follows that the field effect transistor 96 and 97 are alternately rendered in a conducting condition. The field effect transistors 96 and 97 will conduct in accordance with the amplitude of the difference signal appearing on line 67 and in response to being subjected to a ground potential signal at their respective gate elements. In accordance with this operation the field effect transistor which is conducting will render the input line to the operational amplifier at ground level, while the other input to the operational amplifier 82 will be at the level of the difference signal at line 67. To be specific, if the field effect transistor 97 is conducting, the line 98 will be at ground potential while the line 99 will be at the voltage value of the difference signal on line 67. Accordingly, it becomes clear that the signal applied across the input lines 98 and 99 of the operational amplifier 82 is the difference signal and this difference signal is applied at every half cycle of the reference signal so that it is applied at twice the frequency of the reference signal or 2 f.c. The values of the resistors and choice of transistors shown is not critical but were chosen to be used with a carrier frequency of 2500 Hz and an input signal of up to 10 volts. The operational amplifier 82 can be an MC1439 monolithic integrated circuit, manufactured by Motorola and acts to produce a pulsating d.c. signal on line 100.

Figure 8:
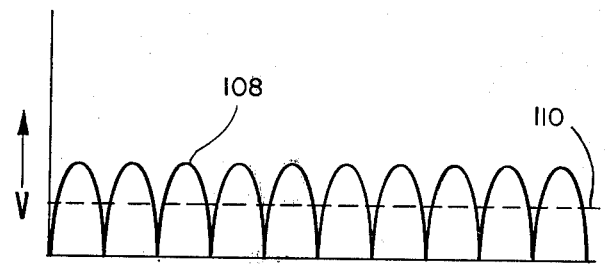
FIG. 8 is a presentation of an unfiltered demodulated signal as it appears on line 100 of FIG. 7.
Figure 9:
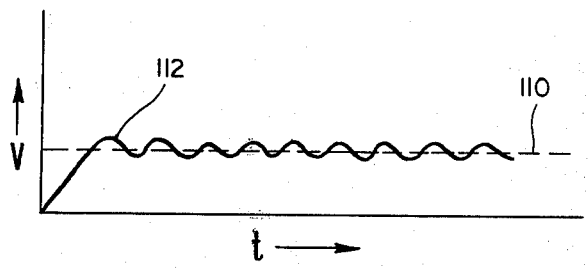
FIG. 9 is a representation of a demodulated signal after it has passed through the low pass filter.

The pulsating d.c. signal 108 emanating from the operational amplifier 82 is at twice the carrier frequency and is depicted in FIG. 8. The dashed line 110 passing through the pulsating d.c. signal representation indicates the d.c. average level or in effect the signal level representing the actual torque. The pulsating d.c. signal on line 100 (FIG. 7) does include unwanted harmonic signals. Hence, this pulsating d.c. signal is transmitted to the low pass filter 70 whose parameters are chosen such that the harmonics are attenuated; i.e., so that only frequency components within a desired bandwidth are passed. The values of the circuit parameters shown are for use with a reference signal frequency of 2500 Hz. However, it should be understood that the values are not critical because they would depend on the reference signal frequency and the design of such a filter is readily understood by those skilled in the art. The operational amplifier 101 can also be an MC1439 described earlier. Hence, the signal emanating on line 102 is a d.c. signal of lower amplitude and containing some component at twide the carrier frequency. The signal 112 appearing on line 102 is a d.c. signal of lower amplitude and containing some component at twice the carrier frequency. The signal 112 appearing on line 102 is depicted in FIG. 9. In FIG.

Figure 10:
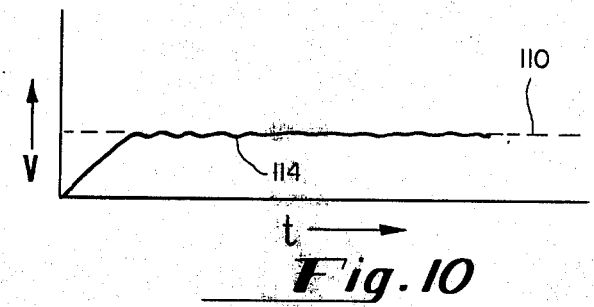
FIG. 10 is a representation of a demodulated signal after it has passed through the low pass filter as well as the notch filter.

9 it will be noted that the d.c. average 110 is at the same amplitude as it was in FIG. 8. It should be noted that signal 112 in FIG. 9 is characterized by having a d.c. component which better represents the difference signal on line 67 because it has had the harmonic signals removed. Thereafter this d.c. signal 112 appearing on line 102 is transmitted to the notch filter 71, which is a double T network whose parameters are chosen to attenuate a signal whose frequency is twice the reference signal frequency. The valves of the circuit parameters are not critical because they would depend on the reference signal frequency and the design of a double T network is readily understood by those skilled in the art. The double T network of notch filter 71 provides a low ripple signal 114 (FIG. 10) on line 103, whose voltage level represents the value or amplitude of the difference signal. Hence, the low ripple signal on line 103 represents the change in position of the vanes, which in turn represents the amount of extraordinary torque being applied for instance to the bolt in our automobile example. The low ripple signal 114 shown in FIG. 10 is a well defined signal which can be considered a d.c. signal.

The d.c. signal on line 103 is transmitted to the operational amplifier 104 wherein it is simply amplified for further use. The double T network needs a high impedance as a load in order to be able to operate at its optimum and the operational amplifier 104 provides that high impedance load. It should be understood that this output signal appearing on line 105 can be applied to any kind of logic to which any reference signal is also applied, so that all types of monitoring arrangements can be employed, as described earlier in the description of FIG. 5. In the preferred embodiment the signal is stored whereby a fixed value can be determined and the peak value or torque can be displayed or further used.

Figure 11:
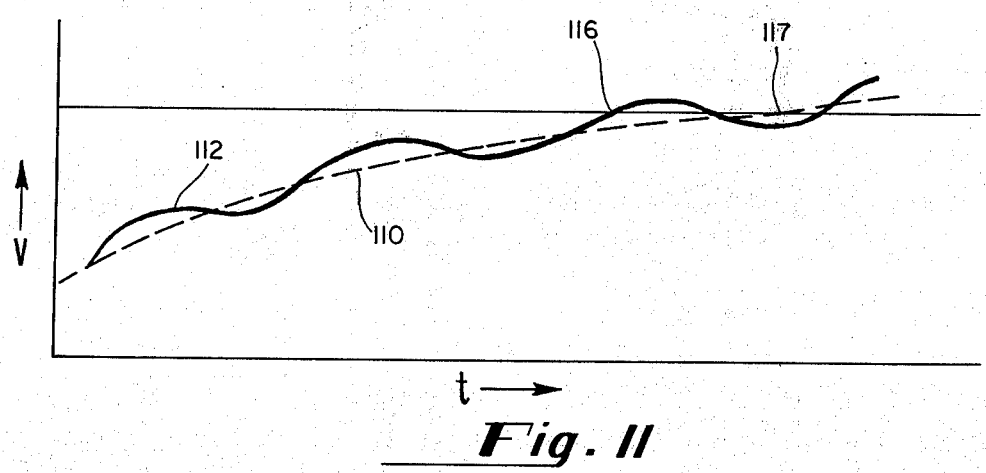
FIG. 11 is a representation of the signal of FIG. 9 and its relationship to a threshold signal with which it is compared.

If the signal representing the actual torque is not "tailored" to a low ripple or d.c. signal then an error could readily occur when such a signal is transmitted to a comparator. FIG. 11 provides a graphic illustration of this possibility. In FIG. 11 the once filtered signal 112 is shown in an amplitude increasing mode (i.e. more torque is being generated). As in FIGS. 9 and 10, the dashed line 110 represents the actual torque level or the analog signal of the actual torque. In FIG. 11 there is shown the threshold signal 115 which is fed into a comparator such as difference amplifiers 72 and 73. If the (ripple) signal 112 has a relatively large "swing" then it will cross the threshold signal at point 116 when actually the analog signal would not cross the threshold signal 115 until point 117. If signal 112 were a low ripple signal such as that shown in FIG. 9 then the crossover would be at approximately point 117.

Figure 12:
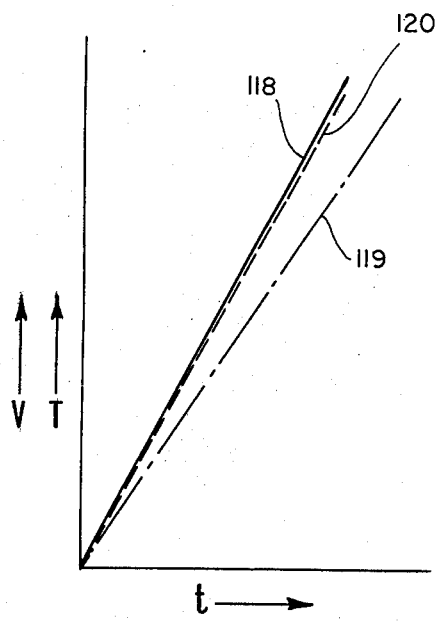
FIG. 12 is a representation of the relationship between torque and output voltage for a conventional filter as well as for the present system.

If conventional methods of filtering are used to reduce the ripple then the number of low pass filters would be increased. Low pass filters normally employ capacitors with other components to effect the attenuation and the R-C networks that result therefrom create great time delays. Such a technique results in a poor response to rapid changes in the frequency of the input signal. Since the input signal is the analog of the physical phenomenon it would mean that the prior technique results in a poor response to a rapid physical change such as a rapid change in torque. Because there are only two stages of filtering and a large amplitude input signal the present system provides an excellent response to rapid changes at the input, often referred to as good transient response. FIG. 12 shows the relationship between an increase of actual torque 118 with time, the resultant analog signal 119 which results from conventional filtering and the resultant analog signal 120 when a system employs the present circuit.

The present system has the advantage of a high level a.c. signal input; i.e. the system is not subject to general instabilities and drift which accompany d.c. input signal arrangements. In addition there is no limit on the total torque to be measured. The torque can be either high or low and the only prerequisite to be met is by the size of the center tube thickness.

I claim:

1. A circuit to be employed with a transducer which translates a mechanical motion into an alternating current electrical signal which includes a carrier frequency signal whose amplitude is representative of said motion, comprising in combination: amplifier means adapted to be connected to said transducer to receive said alternating current signal and to generate an amplitude sinewave-like signal whose amplitude represents a measure of said mechanical motion; signal demodulating means connected to said amplifier means to receive said sinewave-like signal and translate it into a pulsating direct current signal which pulsating direct current signal includes a component having twice the frequency of said carrier signal; low pass filter means connected to said signal demodulating means and formed to receive said pulsating direct current signal and to impede all signal components of said pulsating direct current signal which have a frequency greater than a predetermined value including signals whose frequency is twice said carrier frequency thereby providing a once filtered signal; and notch filter means connected to said low pass filter means and formed to receive said once filtered signal and to attenuate that component of said once filtered signal which has a frequency of twice said carrier frequency thereby providing a non-pulsating direct current signal whose voltage level is a reliable measure of said mechanical motion.

2. A circuit to be employed with a transducer according to claim 1 wherein said transducer includes a bridge circuit having first and second output terminals and further includes a difference amplifier connected to said first and second output terminals.

3. A circuit to be employed with a transducer according to claim 2 wherein there is further included a first adjustable circuit connected to said bridge circuit to correct for a no load phase imbalance in said bridge circuit and a second adjustable circuit connected to said bridge circuit to correct for inherent component mismatch to thereby balance said bridge under no load conditions.

4. A circuit to be employed with a transducer according to claim 1 wherein said transducer has an alternating signal source connected thereto and wherein said signal demodulating means has a reference signal terminal and includes circuitry means connecting said reference signal terminal to said alternating signal source to receive a reference signal therefrom and a difference signal terminal connected to said amplifier means and wherein said signal demodulating means further includes a phase shifting means and a first signal amplifier stage connected to receive said reference signal through said phase shifting means and a second signal amplifier stage connected to receive the output signal from said second signal amplifier stage.

5. A circuit to be employed with a transducer according to claim 1 wherein said notch filter comprises: first and second resistors each having first and second ends and connected in series at their respective first ends and with a first center terminal thereat; first and second capacitors each having first and second ends and connected in series at their respective first ends and with a second center terminal thereat; said first resistor and said first capacitor connected in parallel at their respective second ends and having input signal means thereat; said second resistor and said second capacitor connected in parallel at their respective second ends and having output signals thereat and, a third resistor and a third capacitor, each having first and second ends, said third resistor series connected to said third capacitor through their respective first ends with their respective second ends connected to said first and second center terminals.

* * * * *